US012620412B2

(12) United States Patent
    Asif Bashir et al.

(10) Patent No.: US 12,620,412 B2
(45) Date of Patent: May 5, 2026

(54) SPINTRONIC DEVICE COMPRISING DUAL FGL AND DUAL SPL TO REDUCE PERPENDICULAR FIELD AT WRITING LOCATION

(71) Applicant: Western Digital Technologies, Inc., San Jose, CA (US)

(72) Inventors: Muhammad Asif Bashir, San Jose, CA (US); Alexander Goncharov, Morgan Hill, CA (US); Zhigang Bai, Fremont, CA (US); Masato Shiimoto, Fujisawa (JP); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/959,957

(22) Filed: Nov. 26, 2024

(65) Prior Publication Data

US 2025/0087235 A1     Mar. 13, 2025

Related U.S. Application Data

(62) Division of application No. 18/226,111, filed on Jul. 25, 2023, now Pat. No. 12,190,920.

(Continued)

(51) Int. Cl.
    *G11B 5/235*        (2006.01)
    *G11B 5/127*        (2006.01)
    (Continued)

(52) U.S. Cl.
    CPC .......... *G11B 5/3146* (2013.01); *G11B 5/1278* (2013.01); *G11B 5/235* (2013.01);
    (Continued)

(58) Field of Classification Search
    None
    See application file for complete search history.

(56) References Cited

U.S. PATENT DOCUMENTS 8,208,219 B2    6/2012    Zhang et al.
8,274,811 B2    9/2012    Zhang et al.
                (Continued)

OTHER PUBLICATIONS

Nakagawa, Yuji et al., "Multiple spin injection into coupled field generation layers for low current operation of MAMR heads", IEEE Transactions on Magnetics, Feb. 4, 2022, <https://ieeexplore.ieee.org/document/9703357>.

(Continued)

*Primary Examiner* — Craig A. Renner
(74) *Attorney, Agent, or Firm* — Patterson + Sheridan, LLP

(57)             ABSTRACT

The present disclosure is generally related to a magnetic recording device comprising a magnetic recording head. The magnetic recording head comprises a main pole, a hot seed layer, and a spintronic device disposed between the main pole and the hot seed layer. The spintronic device comprises two field generation layers (FGLs), two spin polarization layers (SPLs), and two spin kill layers. The second SPL of the spintronic device drives the second FGL. The spintronic device further comprises one or more optional thin negative beta material layers, such as layers comprising FeCr, disposed in contact with at least one of the spin kill layers. When electric current is applied, the spin kill layers and optional negative beta material layers eliminate or reduce any spin torque between the FGLs and the SPLs.

20 Claims, 12 Drawing Sheets

Related U.S. Application Data

(60) Provisional application No. 63/421,487, filed on Nov. 1, 2022.

(51) Int. Cl.
    *G11B 5/31*        (2006.01)
    *G11B 5/00*        (2006.01)

(52) U.S. Cl.
    CPC ...... *G11B 5/314* (2013.01); *G11B 2005/0024* (2013.01); *G11B 5/3116* (2013.01)

(56) References Cited

U.S. PATENT DOCUMENTS

| | | | |
|---|---|---|---|
| 8,879,205 B2 | 11/2014 | Shiimoto et al. | |
| 9,099,107 B1 * | 8/2015 | Igarashi et al. | ........ G11B 5/235 |
| 9,230,569 B1 | 1/2016 | Shimoto et al. | |
| 9,230,597 B2 | 1/2016 | Shimoto et al. | |
| 9,336,797 B2 * | 5/2016 | Igarashi et al. | ...... G11B 5/1278 |
| 10,762,917 B1 | 9/2020 | Le et al. | |
| 11,043,234 B2 | 6/2021 | Wu | |
| 2024/0029759 A1 | 1/2024 | Chen et al. | |

OTHER PUBLICATIONS

First Demonstration of Substantial Improvements in HDD Recording Performance "Toshiba Achieves World's Magnetic Recording (MAS-MAMR)", Toshiba, Jan. 13, 2022, pp. 1-5. Microwave Assisted Switching—Microwave Assisted.

Takagishi, Masayuki et al., "Design Concept of MAS Effect Dominant MAMR Head and Numerical Study", IEEE Transactions on Magnetics, vol. 57, Issue 3, Mar. 2021, <https://ieeexplore.ieee.org/document/9208742>.

Tang, Yuhui et al., "Narrow Track Confinement by AC Field Generation Layer in Microwave Assisted Magnetic Recording", IEEE Transactions on Magnetics, vol. 44, Issue 11, Nov. 2008, <https://ieeexplore.ieee.org/document/4717803>.

* cited by examiner

200

270    211         210

272

234

218    220

244    242

S1   204   S2    206     254    230   212    240

260    232

112

300

| | |
|---|---|
| *302* HS OR HS NOTCH | |
| *304* SK1 | |
| *306* SPL1 | |
| *308* SPACER | +P1 / +P2 |
| *310* FGL1 | |
| *318* (-P) | |
| *316* SK2 | |
| *314* SPL2 | |
| *312* SPACER | +P1 / +P2 |
| *320* FGL2 | |
| *322* SPACER | +P1 / +P2 |
| *324* MP OR MP NOTCH | | e⁻

NBM

325 →

| | |
|---|---|
| *302* HS OR HS NOTCH | |
| *304* SK1 | |
| *306* SPL1 | |
| *308* SPACER | +P1 / +P2 |
| *310* FGL1 | |
| *318* NBM / *316* SK2 | -P |
| *326* NBM / *314* SPL2 | -P |
| *312* SPACER | +P1 / +P2 |
| *320* FGL2 | |
| *322* SPACER | +P1 / +P2 |
| *324* MP OR MP NOTCH | | e⁻

NBM 318

NBM 326

Y
Z X

350

| | |
|---|---|
| *302* HS OR HS NOTCH | |
| NBM *328* | -P |
| *304* SK1 | |
| *306* SPL1 | +P1 |
| *308* SPACER | +P2 |
| *310* FGL1 | |
| NBM *318* | -P |
| NBM *326* *316* SK2 | -P |
| *314* SPL2 | +P1 |
| *312* SPACER | +P2 |
| *320* FGL2 | +P1 |
| *322* SPACER | +P2 |
| *324* MP OR MP NOTCH | | e⁻

375

302  HS OR HS NOTCH

NBM
328

-P

NBM
330

304  SK1

-P

306  SPL1

+P1

308  SPACER

+P2

310  FGL1

318

-P

NBM
326

316  SK2

-P

NBM

314  SPL2

+P1

312  SPACER

+P2

320  FGL2

+P1

322  SPACER

+P2

324  MP OR MP NOTCH e⁻

400

| | |
|---|---|
| *302* HS OR HS NOTCH | |
| *322* SPACER | +P2 / +P1 |
| *320* FGL2 | |
| *312* SPACER | +P2 / +P1 |
| *314* SPL2 | |
| *316* SK2 | |
| *310* FGL1 | |
| *308* SPACER | +P2 / +P1 |
| *306* SPL1 | |
| *304* SK1 | |
| *324* MP OR MP NOTCH | | e⁻

425

| | |
|---|---|
| _302_ HS OR HS NOTCH | |
| _322_ SPACER | +P2 / +P1 |
| _320_ FGL2 | |
| _312_ SPACER | +P2 / +P1 |
| _314_ SPL2 | |
| _316_ SK2 | |
| _310_ FGL1 | |
| _308_ SPACER | +P2 / +P1 |
| _306_ SPL1 | |
| _304_ SK1 | |
| NBM _418_ | -P |
| _324_ MP OR MP NOTCH | | e⁻

450

| | |
|---|---|
| *302* HS OR HS NOTCH | |
| *322* SPACER | +P2 / +P1 |
| *320* FGL2 | |
| *312* SK2 | +P2 / +P1 |
| *314* SPL2 | |
| *316* SK2 | |
| *310* FGL1 | |
| *308* SPACER | +P2 / +P1 |
| *306* SPL1 | |
| NBM *426* | -P |
| *304* SK1 | |
| NBM *418* | -P |
| *324* MP OR MP NOTCH | | e⁻

475

| | |
|---|---|
| *302* HS OR HS NOTCH | |
| *322* SPACER | +P2 / +P1 |
| *320* FGL2 | |
| *312* SPACER | +P2 / +P1 |
| *314* SPL2 | |
| *316* SK2 | |
| *428* / *310* FGL1 | -P |
| *308* SPACER | +P2 / +P1 |
| *306* SPL1 | |
| *426* | -P |
| *304* SK1 | |
| *418* | -P |
| *324* MP OR MP NOTCH | | e⁻

NBM 428

NBM 426

NBM 418

485

| | |
|---|---|
| *302* HS OR HS NOTCH | |
| *322* SPACER | +P2 / +P1 |
| *320* FGL2 | |
| *312* SPACER | +P2 / +P1 |
| *314* SPL2 | |
| 430 — *316* SK2 | -P |
| NBM | |
| 428 — | -P |
| NBM | |
| *310* FGL1 | |
| *308* SPACER | +P2 / +P1 |
| NBM *306* SPL1 | |
| 426 — | -P |
| NBM *304* SK1 | |
| 418 — | -P |
| *324* MP OR MP NOTCH | | e⁻

SPINTRONIC DEVICE COMPRISING DUAL FGL AND DUAL SPL TO REDUCE PERPENDICULAR FIELD AT WRITING LOCATION

CROSS-REFERENCE TO RELATED APPLICATIONS

This application is a divisional of co-pending U.S. patent application Ser. No. 18/226,111, filed Jul. 25, 2023, which claims benefit of U.S. provisional patent application Ser. No. 63/421,487, filed Nov. 1, 2022, both of which are herein incorporated by reference.

BACKGROUND OF THE DISCLOSURE

Field of the Disclosure

Embodiments of the present disclosure generally relate to a magnetic recording head comprising a spintronic device, such as a write head of a data storage device, for example a magnetic media drive.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, microwave-assisted magnetic recording (MAMR) is one type of energy-assisted recording technology to improve the recording density of a magnetic recording medium, such as a HDD. In MAMR, a spin torque oscillator (STO) device or a spintronic device is located next to or near the write element such that in operation the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

However, in order to enhance the AC field produced in such STO or spintronic devices, the thickness of various layers within the STO devices need to be increased, such as field generation layers (FGLs). Increasing the thickness of FGLs also increases the perpendicular AC component (Hpac) when writing data, which negatively impacts the overall recording device and causes unwanted cross-talk or spin torque to be generated.

Therefore, there is a need in the art for an improved STO or spintronic device configured to enhance the produced AC field without also increasing the perpendicular AC component.

SUMMARY OF THE DISCLOSURE

The present disclosure is generally related to a magnetic recording device comprising a magnetic recording head. The magnetic recording head comprises a main pole, a shield, and a spintronic device disposed between the main pole and the shield. The spintronic device comprises two field generation layers (FGLs), two spin polarization layers (SPLs), and two spin kill layers. The second SPL of the spintronic device drives the second FGL. The spintronic device further comprises one or more optional thin negative beta material layers, such as layers comprising FeCr, disposed in contact with at least one of the spin kill layers. When electric current is applied, the spin kill layers and optional negative beta material layers eliminate or reduce any spin torque between the FGLs and the SPLs.

In one embodiment, a magnetic recording device comprises a magnetic recording head. The magnetic recording head comprises a main pole, a shield, and a spintronic device disposed between the main pole and the shield. The spintronic device comprises a first spin kill layer, a first spin polarization layer, a first field generation layer, a first negative beta material layer, a second spin kill layer, a second spin polarization layer, and a second field generation layer, wherein the second field generation layer is disposed over the main pole, the second spin polarization layer is disposed over the second field generation layer, the second spin kill layer is disposed on the second spin polarization layer, the first negative beta material layer is disposed in contact with the second spin kill layer, the first field generation layer is disposed over the first negative beta material layer, the first spin polarization layer is disposed over the first field generation layer, and the first spin kill layer is disposed over the first spin polarization layer.

In another embodiment, a magnetic recording device comprises a magnetic recording head. The magnetic recording head comprises a main pole, a shield, and a spintronic device disposed between the main pole and the shield. The spintronic device comprises a first spin kill layer disposed on the main pole, a first spin polarization layer disposed on the first spin kill layer, a first field generation layer disposed over the first spin polarization layer, a second spin kill layer disposed on the first field generation layer, a second spin polarization layer disposed on the second spin kill layer; and a second field generation layer disposed between the second spin polarization layer and the shield.

In yet another embodiment, a magnetic recording device comprises a magnetic recording head. The magnetic recording head comprises a main pole, a shield, and a spintronic device disposed between the main pole and the shield. The spintronic device comprises a first spin kill layer, a first spin polarization layer disposed on the first spin kill layer, a first field generation layer over the first spin polarization layer, a second spin kill layer disposed over the first field generation layer, a second spin polarization layer, a second field generation layer, and one or more negative beta material layers comprising FeCr disposed between the main pole and the second field generation layer. The magnetic recording device further comprises means for flowing a current from the main pole through the spintronic device to the shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a magnetic recording device comprising a magnetic recording head. The magnetic recording head comprises a main pole, a shield, and a spintronic device disposed between the main pole and the shield. The spintronic device comprises two field generation layers (FGLs), two spin polarization layers (SPLs), and two spin kill layers. The second SPL of the spintronic device drives the second FGL. The spintronic device further comprises one or more optional thin negative beta material layers, such as layers comprising FeCr, disposed in contact with at least one of the spin kill layers. When electric current is applied, the spin kill layers and optional negative beta material layers eliminate or reduce any spin torque between the FGLs and the SPLs.

Figure 1:
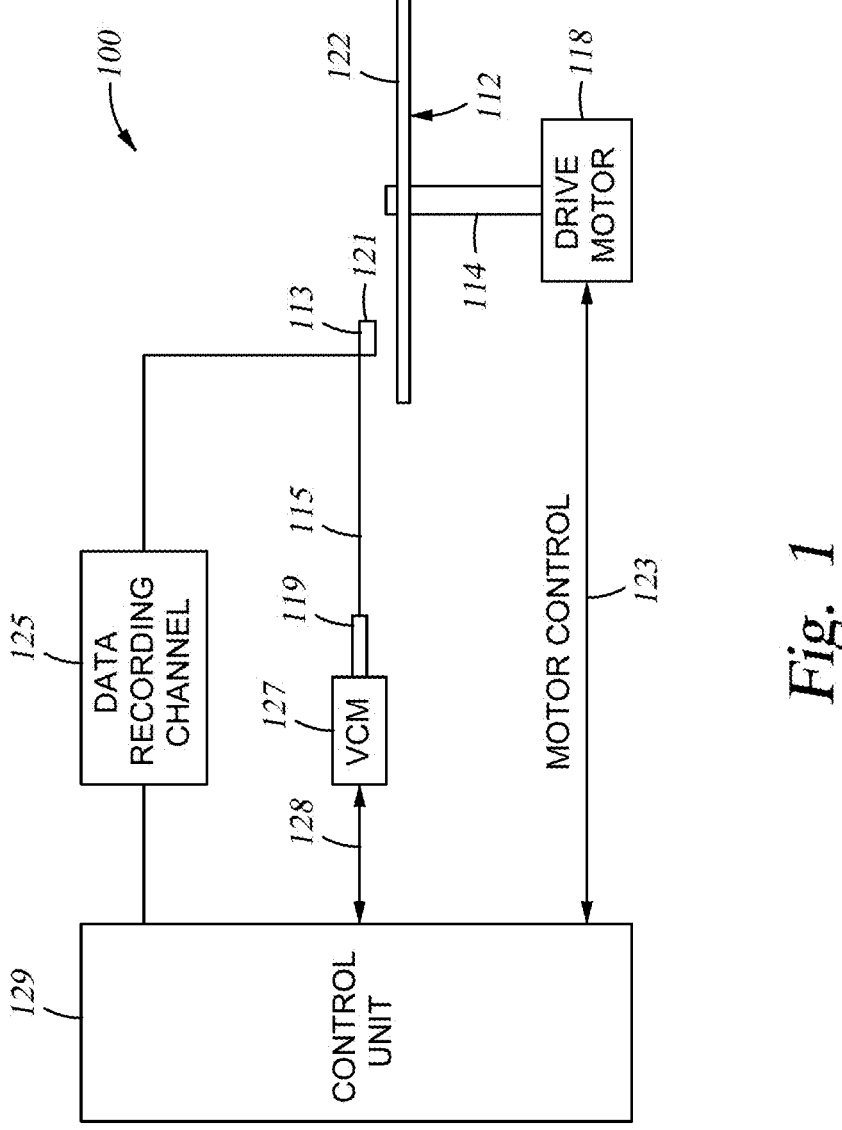
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
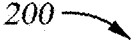
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

FIGS. 3A-3D illustrate reverse spintronic devices 300, 325, 350, 375, according to various embodiments. Each spintronic device 300, 325, 350, and 375 may independently be the spintronic device 230 of FIG. 2, and each spintronic device 300, 325, 350, and 375 is disposed in a gap between a main pole, such as the main pole 220 of FIG. 2, and a shield, such as the trailing shield 240 of FIG. 2, a leading shield 206 of FIG. 2, or a side shield (not shown). Each spintronic device 300, 325, 350, 375 may individually be a part of the disk drive 100 of FIG. 1, or a part of the read/write head 200 of FIG. 2. Each spintronic device 300, 325, 350, 375 may be referred to herein as a spin torque oscillator (STO) or STO stack.

Figure 3A:
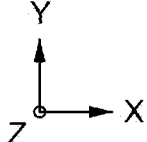
FIGS. 3A-3D illustrate reverse spintronic devices, according to various embodiments.

The spintronic device 300 of FIG. 3A comprises a hot shield (HS) or HS notch 302 disposed adjacent to the shield (not shown), a first spin kill layer (SK1) 304, a first spin polarization layer (SPL1) 306, a first spacer layer 308, a first field generation layer (FGL1) 310, a first a first negative beta material (NBM) layer 318, a second SK layer (SK2) 316, a second SPL (SPL2) 314, a second spacer layer 312, a second FGL (FGL2) 320, a third spacer layer 322, and a main pole (MP) or MP notch 324. The third spacer layer 322 is disposed on the MP or MP notch 324, the FGL2 320 is disposed on the third spacer layer 322, the second spacer layer 312 is disposed on the FGL2 320, the SPL2 314 is disposed on the second spacer layer 312, the SK2 316 is disposed on the SPL2 314, the first NBM layer 318 is disposed on the SK2 316, the FGL1 310 is disposed on the first NBM layer 318, the first spacer layer 308 is disposed on the FGL1 310, the SPL1 306 is disposed on the first spacer layer 308, the SK1 304 is disposed on the SPL1 306, and the SK1 304 is disposed on a HS or HS notch 302. The HS or HS notch 302 may be disposed on a trailing shield, a leading shield, or a side shield. The SPL1 306 drives the FGL1 310 and the SK1 304 isolates the SPL1 306 from the HS or HS notch 302. The FGL2 320 is driven by the MP or MP notch 324 and the SPL2 314. The SK2 316 isolates the SPL2 314 and the FGL1 310.

Figure 3B:
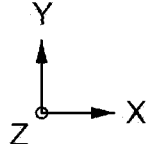

The spintronic device 325 of FIG. 3B is the same as the spintronic device 300 of FIG. 3A; however, the spintronic device 325 further comprises a second NBM layer 326 disposed between the SPL2 314 and the SK2 316 such that the SK2 316 is sandwiched between the first NBM layer 318 and the second NBM layer 326.

Figure 3C:
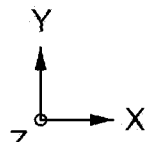

The spintronic device 350 of FIG. 3C is the same as the spintronic device 325 of FIG. 3B; however, the spintronic device 325 further comprises a third NBM layer 328 disposed between the HS or HS notch 302 and the SK1 304.

Figure 3D:
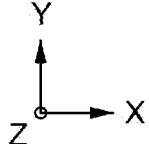

The spintronic device 375 of FIG. 3D is the same as the spintronic device 350 of FIG. 3C; however, the spintronic device 375 further comprises a fourth NBM layer 330 disposed between the SPL1 306 and the SK1 304 such that the SK1 304 is sandwiched between the third NBM layer 328 and the fourth NBM layer 330.

In each spintronic device 300, 325, 350, 375, the HS or HS notch 302 may comprise a material having a high magnetic moment (Bs). The SPL1 306 and the SPL2 316 may each individually comprise single layers or multilayer combinations of materials having a Bs between about 0.5 T to about 1.6 T, for example, NiFe. The first, second, and third spacer layers 308, 312, 322 may each individually comprise a long spin-diffusion length material such as Cu, Ag, or Cu and Ag alloys, or combinations thereof having a thickness in the y-direction of about 2 nm to about 8 nm. In some embodiments, the third spacer layer 308 is a seed layer comprising a non-magnetic material, such as Ni, Cr, Ta, Ru, NiTa, NiCr, etc. The FGL1 310 and the FGL2 320 may each individually comprise single layers or multilayer combinations materials having a Bs between about 2 T to about 2.5 T and an anisotropy magnetic field (Hk) of about 0.5 T to about 1.5 T, such as multilayer structures of CoFe. When an electric current is applied, the electric current may flow from the HS or HS notch 302 through the STO 300, 325, 350, or 375 to the MP or MP notch 324 in the −y-direction, as shown by the arrow labeled e-flow.

The SK1 304 and the SK2 316 may each individually comprises a non-magnetic material having a high resistivity (e.g., greater than about 100 nano-Ohm·m), such as Cr, Ta, NiCr, NiTa, or combinations thereof. The first NBM layer 318 comprises FeCr and has a thickness of about 1 nm. The first NBM layer 318 is disposed between the FGL2 320 and the SK2 316 to eliminate any torque between the FGL1 310 and the FGL2 320 that may be generated when the electric current is applied.

The SK1 304 and the SK2 316 may each individually has a thickness in the y-direction of about 2 nm to about 5 nm. In each spintronic device 300, 325, 350, 375, the SK2 316 is disposed between the FGL1 310 and the SPL2 314 to eliminate any spin torque between the FGL1 310 and the SPL2 314 that may be generated when the electric current is applied, and the SK1 304 is disposed between the SPL1 306 and the HS or HS notch 302 to eliminate any spin torque between the SPL1 306 and the HS or HS notch 302 that may be generated when the electric current is applied.

The first, second, third, and fourth NBM layers 318, 326, 328, 330 each individually comprises FeCr and have a thickness in the y-direction of about 1 nm. The first, second, third, and fourth NBM layers 318, 326, 328, 330 provide negative polarization (−P) at the interface between the various layers. For example, the polarization at the interface between the MP or MP notch 324 and the third spacer layer 322 is positive (+P2), and the polarization between the third spacer layer 322 and the FGL2 320 is positive (+P1). Similarly, the polarizations between the FGL2 320 and the second spacer layer 312, between the second spacer layer 312 and the SPL2 314, between the first spacer layer 308 and the FGL1 310, and between the first spacer layer 308 and the SPL1 306, are all positive.

However, in the STOs 300, 325, 350, and 375, the interface between the first NBM layer 318 and the SK2 layer 316 is negative. In the STOs 325, 350, and 375 comprising the second NBM layer 326, the polarization at the interface between the second NBM layer 326 and the SPL2 314 is negative. In the STOs 350 and 375, the polarization at the interface between the HS or HS notch 302 and the third NBM layer 326 is negative. In the STO 375, the polarization at the interface between the SPL1 306 and the fourth NBM layer 330 is negative. The negative polarization introduced by the various NBM layers 318, 326, 328, 330 enhances performance of the spintronic devices 300, 325, 350, and 375, even if cross-talk occurs during operation. As such, the NBM layers 318, 326, 328, and/or 330 further eliminate or reduce any spin torque between the FGL2 320 and the SPL2 314 that may be generated when the electric current is applied, and further eliminate or reduce any spin torque between the SPL1 306 and the HS or HS notch 302 that may be generated when the electric current is applied.

FIGS. 4A-4E illustrate forward STO stacks 400, 425, 450, 475, 485, according to various embodiments. Each spintronic device 400, 425, 450, 475, and 485 may independently be the spintronic device 230 of FIG. 2, and each spintronic device 400, 425, 450, 475, and 485 is disposed in a gap between a main pole, such as the main pole 220 of FIG. 2, and a shield, such as the trailing shield 240 of FIG. 2, a leading shield 206 of FIG. 2, or a side shield (not shown). Each spintronic device 400, 425, 450, 475, 485 may individually be a part of the disk drive 100 of FIG. 1, or a part of the read/write head 200 of FIG. 2. Each spintronic device 400, 425, 450, 475, 485 may be referred to herein as a STO or STO stack.

Figure 4A:
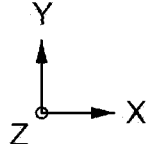
FIGS. 4A-4E illustrate forward spintronic devices, according to various embodiments.

The spintronic device 400 of FIG. 4A comprises the SK1 304 disposed on the MP 324, the SPL1 306 disposed on the SK1 304, the first spacer layer 308 disposed on the SPL1 306, the FGL1 310 disposed on the first spacer layer 308, the SK2 316 disposed on the FGL1 310, the SPL2 314 disposed on the SK2 316, the second spacer layer 312 disposed on the SPL2 314, the FGL2 320 disposed on the second spacer layer 312, the third spacer layer 322 disposed on the FGL2 320, and the HS 302 disposed on the third spacer layer 322. The HS or HS notch 302 may be disposed on a trailing shield, a leading shield, or a side shield. The SPL2 314 and the HS or HS notch 302 drive the FGL2 320 while the SPL1 306 drives the FGL1 310.

Figure 4B:
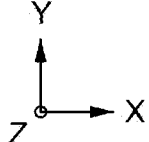

The spintronic device 425 of FIG. 4B is the same as the spintronic device 400 of FIG. 4A; however, the spintronic device 425 further comprises a first NBM layer 418 disposed between the SK1 304 and the MP 324.

Figure 4C:
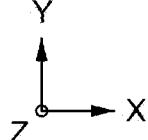

The spintronic device 450 of FIG. 4C is the same as the spintronic device 425 of FIG. 4B; however, the spintronic device 450 further comprises a second NBM layer 426 disposed between the SK1 304 and the SPL1 306 such that the SK1 304 is sandwiched between the first NBM layer 418 and the second NBM layer 426.

Figure 4D:
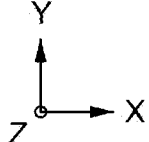

The spintronic device 475 of FIG. 4D is the same as the spintronic device 450 of FIG. 4C; however, the spintronic device 475 further comprises a third NBM layer 428 disposed between the FGL1 310 and the SK2 316.

Figure 4E:
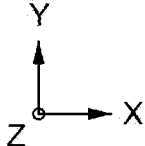

The spintronic device 485 of FIG. 4E is the same as the spintronic device 475 of FIG. 4D; however, the spintronic device 485 further comprises a fourth NBM layer 430 disposed between the SK2 316 and the SPL2 314 such that the SK2 316 is sandwiched between the third NBM layer 428 and the fourth NBM layer 430.

When an electric current is applied, the electric current may flow from the MP 324 through the STO 400, 425, 450, 475, or 485 to the HS 302 in the y-direction, as shown by the arrow labeled e-flow. In each spintronic device 400, 425, 450, 475, 485, the SK1 304 is disposed between the SPL1 306 and the main pole 324 to eliminate any spin torque between the SPL1 306 and the main pole 324 that may be generated when the electric current is applied, and the SK2 316 is disposed between the SPL2 314 and the FGL1 310 to eliminate any spin torque between the SPL2 314 and the FGL1 310 that may be generated when the electric current is applied.

The first, second, third, and fourth NBM layers 418, 426, 428, 430 each individually comprises FeCr and have a thickness in the y-direction of about 1 nm. The first, second, third, and fourth NBM layers 418, 426, 428, 430 provide negative polarization (−P) at the interface between the various layers. For example, the polarization at the interface between the SPL1 306 and the first spacer layer 308 is positive (+P1), and the polarization at the interface between the first spacer layer 308 and the FGL1 310 is positive (+P2). Similarly, the polarizations at the interfaces between the SPL2 314 and the second spacer layer 312, between the second spacer layer 312 and the FGL2 320, between the FGL2 320 and the third spacer layer 322, and between the third spacer layer 322 and the HS 302, are all positive.

However, in the STOs 425, 450, 475, and 485, the interface between the first NBM layer 418 and the SK1 layer 304 is negative. In the STOs 450, 475, and 485 comprising the second NBM layer 426, the polarization at the interface between the second NBM layer 426 and the SK1 layer 304 is negative. In the STOs 475 and 485, the polarization at the interface between third NBM layer 428 and the SK2 316 is negative. In the STO 485, the polarization at the interface between the fourth NBM layer 430 and the SK2 316 is negative. The negative polarization introduced by the various NBM layers 418, 426, 428, 430 enhances performance of the spintronic devices 425, 450, 475, and 485, even if cross-talk occurs during operation. As such, the NBM layers 418, 426, 428, and/or 430 further eliminate or reduce any spin torque between the SPL1 306 and the main pole 324 that may be generated when the electric current is applied, and between the SPL2 314 and the FGL2 320 to eliminate or reduce any spin torque between the SPL2 314 and the FGL2 320 that may be generated when the electric current is applied.

Figure 5:
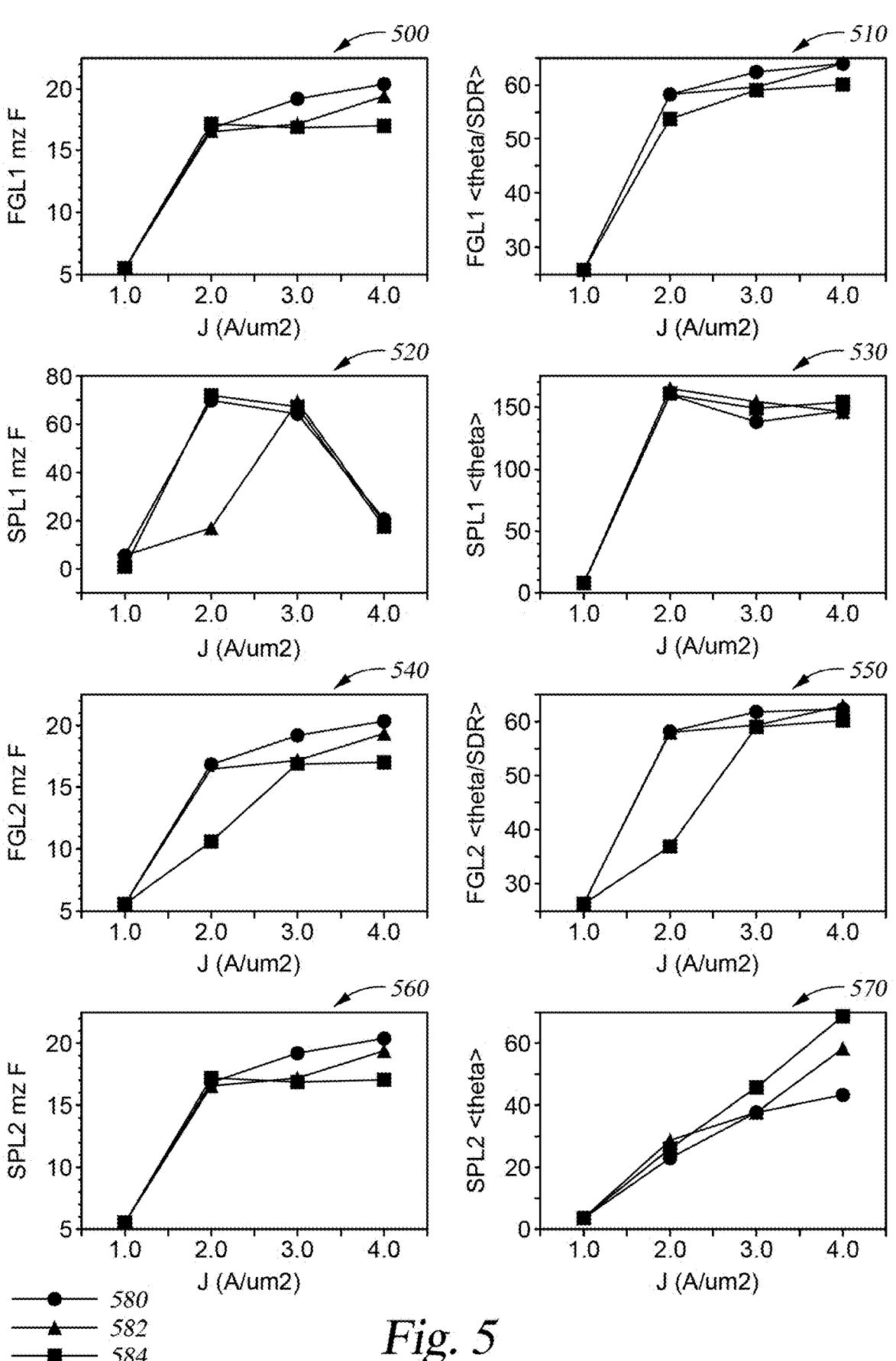
FIG. 5 illustrates graphs showing the effects of spin torque generated in a spintronic device comprising at least one spin kill layer, according to various embodiments.

FIG. 5 illustrates graphs 500, 510, 520, 530, 540, 550, 560, 570, showing the effects of spin torque generated in a spintronic device comprising at least one spin kill layer, according to various embodiments. Each graph 500-570 may apply to any of the spintronic devices 300, 325, 350, 375 of FIGS. 3A-3D, or apply to any of the spintronic devices 400, 425, 450, 475, 485 of FIGS. 4A-4E.

Graphs 500 and 510 illustrate the frequency of the FGL1 310 versus current applied, graphs 520 and 530 illustrate the frequency of the SPL1 306 versus current applied, graphs 540 and 550 illustrate the frequency of the FGL2 320 versus current applied, and graphs 560 and 570 illustrate the frequency of the SPL2 314 versus current applied.

In each graph 500, 510, 520, 530, 540, 550, 560, 570, line 580 represents zero spin torque, line 582 represents 20% spin torque generated when an electric current is applied, and line 584 illustrates 40% spin torque generated when an electric current is applied. As shown in each graph by lines 580, 582, and 584, any generated spin torque has little to no effect on the frequency with respect to the bias on the precession of the FGL1 310, SPL1 304, FGL2 320, or the SPL2 314. As such, including at least the second spin kill layer 316 between the FGL2 320 and the SPL2 314 effectively eliminates the effect of any torque or cross-talk generated during operation of the spintronic devices.

Therefore, by including two spin kill layers in spintronic devices comprising dual FGLs and dual SPLs, as well as including one or more negative beta material layers, any spin torque generated between the various FGLs and SPLs when electric current is applied can be reduced or eliminated. Furthermore, by including the one or more negative beta material layers, the overall performance of the magnetic recording head or magnetic recording device comprising the spintronic device is improved, even if cross-talk occurs during operation.

In one embodiment, a magnetic recording device comprises a magnetic recording head. The magnetic recording head comprises a main pole, a shield, and a spintronic device disposed between the main pole and the shield. The spintronic device comprises a first spin kill layer, a first spin polarization layer, a first field generation layer, a first negative beta material layer, a second spin kill layer, a second spin polarization layer, and a second field generation layer, wherein the second field generation layer is disposed over the main pole, the second spin polarization layer is disposed over the second field generation layer, the second spin kill layer is disposed on the second spin polarization layer, the first negative beta material layer is disposed in contact with the second spin kill layer, the first field generation layer is disposed over the first negative beta material layer, the first spin polarization layer is disposed over the first field generation layer, and the first spin kill layer is disposed over the first spin polarization layer.

The spintronic device further comprises a second negative beta material layer disposed between and in contact with the second spin polarization layer and the second spin kill layer. The spintronic device further comprises a third negative beta material layer disposed in contact with the first spin kill layer. The spintronic device further comprises a fourth negative beta material layer disposed between the first spin kill layer and the first spin polarization layer. The first, second, third, and fourth negative beta material layers each individually comprises FeCr and has a thickness of about 1 nm. The spintronic device further comprises a first spacer layer disposed between and in contact with the first spin polarization layer and the first field generation layer, a second spacer layer disposed between and in contact with the second field generation layer and the second spin polarization layer, and a third spacer layer disposed between the second field generation layer and the main pole. The first and second spin kill layers each comprises a non-magnetic material having a resistivity greater than about 100 nano-Ohm·m. A magnetic recording device comprises the magnetic recording head, the magnetic recording device configured to flow a current from the shield through the spintronic device to the main pole.

In another embodiment, a magnetic recording device comprises a magnetic recording head. The magnetic recording head comprises a main pole, a shield, and a spintronic device disposed between the main pole and the shield. The spintronic device comprises a first spin kill layer disposed on the main pole, a first spin polarization layer disposed on the first spin kill layer, a first field generation layer disposed over the first spin polarization layer, a second spin kill layer disposed on the first field generation layer, a second spin polarization layer disposed on the second spin kill layer; and a second field generation layer disposed between the second spin polarization layer and the shield.

The spintronic device further comprises a first negative beta material layer disposed between the main pole and the first spin kill layer. The spintronic device further comprises a second negative beta material layer disposed between the first spin kill layer and the first spin polarization layer. The spintronic device further comprises a third negative beta material layer disposed between the first field generation layer and the second spin kill layer, and a fourth negative beta material layer disposed between the second spin polarization layer and the second spin kill layer, wherein the first, second, third, and fourth negative beta material layers each individually has a thickness of about 1 nm. The first, second, third, and fourth negative beta material layers each individually comprises FeCr, and wherein the first and second spin kill layers each individually comprises a non-magnetic material having a resistivity greater than about 100 nano-Ohm·m. The spintronic device further comprises a first spacer layer disposed between the first field generation layer and the first spin polarization layer, a second spacer layer disposed between the second field generation layer and the second spin polarization layer, and a third spacer layer disposed between the second field generation layer and the shield. The third spacer layer is disposed in contact with a hot seed layer or a hot seed notch, wherein the hot seed layer is disposed on the shield, and wherein the hot seed notch is disposed on the hot seed layer. A magnetic recording device comprises the magnetic recording head, the magnetic recording device configured to flow a current from the main pole through the spintronic device to the shield.

In yet another embodiment, a magnetic recording device comprises a magnetic recording head. The magnetic recording head comprises a main pole, a shield, and a spintronic device disposed between the main pole and the shield. The spintronic device comprises a first spin kill layer, a first spin polarization layer disposed on the first spin kill layer, a first field generation layer over the first spin polarization layer, a second spin kill layer disposed over the first field generation layer, a second spin polarization layer, a second field generation layer, and one or more negative beta material layers comprising FeCr disposed between the main pole and the second field generation layer. The magnetic recording device further comprises means for flowing a current from the main pole through the spintronic device to the shield.

The one or more negative beta material layers are disposed in contact with either the first spin kill layer or the second spin kill layer. The spintronic device further comprises a first spacer layer disposed between the first spin polarization layer and the first field generation layer, a second spacer layer disposed between the second spin polarization layer and the second field generation layer, and a third spacer layer disposed between the second field generation layer and the shield, the third spacer layer comprising a seed material. The one or more negative beta material layers each has a thickness of about 1 nm, and wherein the first spin kill layer and the second spin kill layer each individually comprises a non-magnetic material having a resistivity greater than about 100 nano-Ohm·m. The first spin kill layer is disposed on the main pole, the second spin polarization layer is disposed on the second spin kill layer, and the second field generation layer is disposed between the second spin polarization layer and the shield.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head comprising:
a shield;
a main pole; and
a spintronic device disposed between the shield and the main pole, the spintronic device comprising:
a first spin kill layer;
a first spin polarization layer;
a first field generation layer;
a first negative beta material layer;
a second spin kill layer;
a second spin polarization layer; and
a second field generation layer,
wherein the second field generation layer is disposed over the main pole, the second spin polarization layer is disposed over the second field generation layer, the second spin kill layer is disposed over the second spin polarization layer, the first negative beta material layer is disposed in contact with the second spin kill layer, the first field generation layer is disposed over the first negative beta material layer, the first spin polarization layer is disposed over the first field generation layer, and the first spin kill layer is disposed over the first spin polarization layer.

2. The magnetic recording head of claim 1, wherein the spintronic device further comprises a second negative beta material layer disposed between and in contact with the second spin polarization layer and the second spin kill layer.

3. The magnetic recording head of claim 2, wherein the spintronic device further comprises a third negative beta material layer disposed in contact with the first spin kill layer.

4. The magnetic recording head of claim 3, wherein the spintronic device further comprises a fourth negative beta material layer disposed between the first spin kill layer and the first spin polarization layer.

5. The magnetic recording head of claim 4, wherein the first, second, third, and fourth negative beta material layers each individually comprises FeCr and has a thickness of about 1 nm.

6. The magnetic recording head of claim 1, wherein the spintronic device further comprises:
a first spacer layer disposed between and in contact with the first spin polarization layer and the first field generation layer;
a second spacer layer disposed between and in contact with the second field generation layer and the second spin polarization layer; and
a third spacer layer disposed between the second field generation layer and the main pole.

7. The magnetic recording head of claim 1, wherein the first and second spin kill layers each comprises a non-magnetic material having a resistivity greater than about 100 nano-Ohm·m.

8. A magnetic recording device comprising the magnetic recording head of claim 1, the magnetic recording device configured to flow a current from the shield through the spintronic device to the main pole.

9. A magnetic recording head comprising:
a shield;
a main pole; and
a spintronic device disposed between the shield and the main pole, the spintronic device comprising:
a first field generation layer disposed adjacent to the main pole;
a first spin polarization layer disposed over the first field generation layer;
a first spin kill layer disposed over the first spin polarization layer;
a second field generation layer disposed over the first spin kill layer;
a second spin polarization layer disposed over the second field generation layer;
a second spin kill layer disposed between the second spin polarization layer and the shield; and
one or more negative beta material layers disposed between the main pole and the shield.

10. The magnetic recording head of claim 9, wherein the second spin kill layer is disposed in contact with the shield.

11. The magnetic recording head of claim 9, wherein the second spin kill layer is disposed in contact with the second spin polarization layer.

12. The magnetic recording head of claim 9, wherein a first negative beta material layer of the one or more negative beta material layers is disposed between the first spin kill layer and the second field generation layer.

13. The magnetic recording head of claim 9, wherein each of the one or more negative beta material layers is disposed in contact with either the first spin kill layer or the second spin kill layer.

14. A magnetic recording device comprising the magnetic recording head of claim 9, the magnetic recording device configured to flow a current from the shield through the spintronic device to the main pole.

15. A magnetic recording device, comprising:
a magnetic recording head, the magnetic recording head comprising:
   a shield;
   a main pole; and
   a spintronic device disposed between the shield and the main pole, the spintronic device comprising:
      a first field generation layer disposed adjacent to the main pole;
      a first spin polarization layer disposed over the first field generation layer;
      a first spin kill layer disposed over the first spin polarization layer;
      a second field generation layer disposed over the first spin kill layer;
      a second spin polarization layer disposed over the second field generation layer;
      a second spin kill layer disposed between the second spin polarization layer and the shield; and
      one or more negative beta material layers disposed between the first spin polarization layer and the shield; and
means for flowing a current from the shield through the spintronic device to the main pole.

16. The magnetic recording device of claim 15, wherein the first and second spin kill layers each comprises a non-magnetic material having a resistivity greater than about 100 nano-Ohm·m.

17. The magnetic recording device of claim 15, wherein each of the one or more negative beta material layers is disposed in contact with either the first spin kill layer or the second spin kill layer.

18. The magnetic recording device of claim 15, wherein a first negative beta material layer of the one or more negative beta material layers is disposed between the first spin kill layer and the second field generation layer, and wherein a second negative beta material layer of the one or more negative beta material layers is disposed between the first spin kill layer and the first spin polarization layer.

19. The magnetic recording device of claim 18, wherein a third negative beta material layer of the one or more negative beta material layers is disposed between the second spin kill layer and the shield, and wherein a fourth negative beta material layer of the one or more negative beta material layers is disposed between the second spin kill layer and the second spin polarization layer.

20. The magnetic recording device of claim 15, wherein the one or more negative beta material layers each individually comprises FeCr and has a thickness of about 1 nm.

* * * * *